United States Patent [19]

McDaniel et al.

[11] Patent Number: 5,697,626
[45] Date of Patent: Dec. 16, 1997

[54] EXTENDABLE VEHICLE RUNNING BOARD

[75] Inventors: Patrick K. McDaniel; Gale E. McDaniel, both of Richland, Wash.

[73] Assignee: McDaniel Manufacturing, Inc., Richland, Wash.

[21] Appl. No.: 442,576

[22] Filed: May 16, 1995

[51] Int. Cl.⁶ .................................................. B60R 3/02
[52] U.S. Cl. .................................... 280/166; 182/91
[58] Field of Search ............... 182/88, 91; 414/540, 414/545, 921; 280/163, 166, 164.1

[56] References Cited

U.S. PATENT DOCUMENTS

| | | | |
|---|---|---|---|
| 431,307 | 7/1890 | Wood et al. | 182/88 |
| 757,680 | 4/1904 | Reynolds . | |
| 2,062,026 | 11/1936 | Hassel | 280/166 |
| 3,608,957 | 9/1971 | Maneck | 296/146 |
| 3,758,134 | 9/1973 | Stewart | 280/163 |
| 3,774,720 | 11/1973 | Hovey | 182/88 X |
| 3,887,217 | 6/1975 | Thomas | 280/166 |
| 4,249,634 | 2/1981 | Potts | 182/1 |
| 4,275,664 | 6/1981 | Reddy | 280/166 X |
| 4,453,684 | 6/1984 | Hanks | 280/166 X |
| 4,457,402 | 7/1984 | Del Vecchio et al. | 280/166 X |
| 4,909,700 | 3/1990 | Fontecchio et al. | 414/549 |
| 5,137,294 | 8/1992 | Martin | 280/166 |
| 5,358,268 | 10/1994 | Hawkins | 280/166 |

FOREIGN PATENT DOCUMENTS

| | | |
|---|---|---|
| 63-255144 | 10/1988 | Japan . |
| 403594 | 5/1974 | U.S.S.R. . |
| PCT/US91/06163 | 3/1992 | WIPO . |

*Primary Examiner*—Brian L. Johnson
*Assistant Examiner*—Michael Mar
*Attorney, Agent, or Firm*—Christensen O'Connor Johnson & Kindness PLLC

[57] ABSTRACT

A running board for an overland vehicle including first and second bell cranks with swing arms which move relative to the vehicle in opposing arcuate displacements. An elongated central running board member is flexibly connected to the swing arms to form a linkage which is extended and retracted. An extension compensator is included to compensate for changes in the overall length of the linkage. A motor-powered drive pivots the swing arms and preferably provides a control mechanism which coordinates the swing arm motions to keep the running board level. The drive can be automatically controlled by a door switch or other sensor.

36 Claims, 4 Drawing Sheets

EXTENDABLE VEHICLE RUNNING BOARD

TECHNICAL FIELD

The present invention relates to an improved running board for an overland vehicle, and more specifically to a moveable running board which includes an apparatus for controllably extending and retracting the running board from a first, stored position, to a second, deployed position.

BACKGROUND OF THE INVENTION

The prior art includes a number of fixed running boards and extendible and retractable steps of various designs which may be employed on overland vehicles. Extendible assemblies normally include a step or footrest surface which may be moved between a retracted position and an extended operational position in which to assist passengers entering or exiting from the vehicle.

While the prior art devices have operated with varying degrees of success, they have several shortcomings which have detracted from their usefulness. For example, many of the commercially available running boards which are installed as standard equipment on vehicles are normally fixed at a predetermined height and orientation relative to the vehicle. Although they can provide an intermediate step which facilitates the entry and exit of passengers from the vehicle, these devices are still placed high above the ground. This requires individuals who are entering or exiting the vehicle to lift up or reach down with their feet a substantial distance in order to place them onto the running board or the surface of the earth, as the case may be. If the surface of the earth is uneven, the distance may be even greater, thereby making the entrance or exit from the vehicle, for some individuals, quite difficult or even hazardous. Such may be particularly problematic in the case of people who have various physical handicaps or limitations.

The prior art apparatus also in general do not satisfactorily address the needs of vans, crew cab pickup, or other four-door vehicles which have a need to assist persons by providing more convenient footrests over an extended length along the side of the vehicle.

Moreover, most prior art apparatus have further been unattractive in view of their complexity of design, and their associated costs of manufacturing. Thus there is a need for an improved extendible and retractable running board.

SUMMARY OF THE INVENTION

The vehicle running board apparatus of the present invention includes first and second end members mounted to the vehicle, a longitudinal running board member pivotably connected to the end members, an extension linkage subassembly, a drive assembly for rotating the end members, and a control system for automatically initiating extension and retraction of the running board apparatus.

In accordance with aspects of the invention, the first and second end members are preferably bell cranks, each bell crank having a rotatable collar or sleeve portion, a swing arm, and a control arm. The bell cranks are attached to the vehicle in an orientation such that the collar portion extends horizontally outward from the vehicle while the control and swing arms are oriented in a plane generally transverse to the collar portion.

In accordance with other aspects of the invention, the bell cranks are supported on the vehicle by first and second supports having a support base and a support shaft, the support base being rigidly attached to the vehicle chassis or frame and the support shaft being rigidly attached to, or integrally formed with, the base and extending outward from the vehicle in a generally horizontal plane. The bell crank collars are mounted to the support shafts and rotate thereabout them.

In accordance with further aspects of the invention, the longitudinal member is preferably connected at each end to an end member swing arm to allow relative angular displacement between the longitudinal member and each swing arm. Facia pieces may optionally be attached to the longitudinal member, the end member swings arms, or some combination thereof.

In accordance with still further aspects of the invention, the extension linkage subassembly includes a retractable and extendable portion for permitting movement of the vehicle running board apparatus between retracted and extended positions. The retracted vehicle running board position includes the longitudinal member lying at a first height, while the extended vehicle running board position includes the longitudinal member lying at a second height that is vertically lower than the first height.

In accordance with yet other aspects of the invention, the extension linkage subassembly is preferably formed by the combination of the longitudinal member and the first and second end member swing arms. The second end member swing arm includes first and second portions in a telescopic or sliding relation. The preferred vehicle running board apparatus further includes a biasing member for urging the first and second portions toward each other. An optimal biasing member being a compression spring.

In accordance with yet further aspects of the invention, the drive assembly preferably includes a drive motor having a drive shaft upon which an output bar having opposed ends is attached. A first connecting rod is rotatably attached at a proximal end to an end of the output bar. A second connecting rod is rotatably attached at a proximal end to the opposed output bar end. Distal connecting rod ends are rotatably attached to the first and second end members, and in particular, to the control arms. Angular rotation of the drive shaft causes angular displacement of the connecting rods and their respective end member control arms, further causing extension or retraction of the extension linkage subassembly and its corresponding lowering or raising of the longitudinal member.

In accordance with still yet other aspects of the invention, the control system includes a sensor such as a door activated switch for sensing the position of the vehicle door. A controller receives an input signal from the sensor. The controller is connected to the drive motor and outputs a signal to the drive motor in order to effectuate the appropriate vehicle running board apparatus response.

BRIEF DESCRIPTION OF THE DRAWINGS

Preferred embodiments of the invention are described hereinafter with reference to the accompanying drawings, which are briefly described, below.

FIG. 3 is a partial side elevational view similar to FIG. 2 with the running board moved into an extended position.

DETAILED DESCRIPTION OF THE PREFERRED EMBODIMENT

This disclosure of the invention is submitted in furtherance of the constitutional purposes of the U.S. Patent Laws "to promote the progress of science and useful arts" (Article 1, Section 8).

Figure 1:
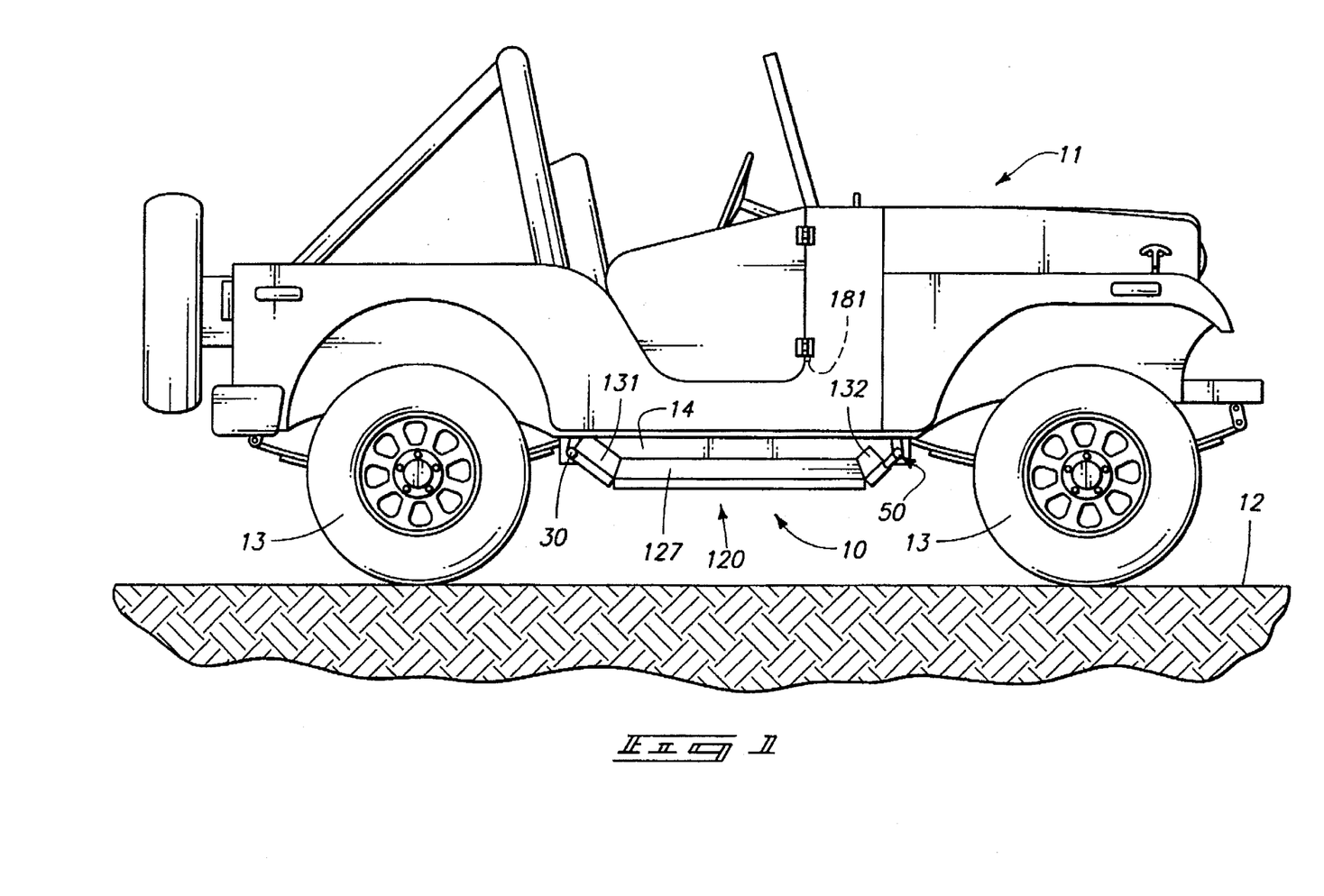
FIG. 1 is a side elevational view of the apparatus of the present invention shown in an extended deployed position on an overland vehicle of conventional design.

A preferred vehicle running board apparatus according to the present invention is generally shown by the numeral 10 in FIG. 1. The running board 10 is mounted on an overland vehicle 11. The vehicle is shown upon the surface of the earth or other supporting ground 12. The overland vehicle has earth-engaging tires 13, which position the overland vehicle, and more specifically a chassis or frame 14, above the surface of the earth.

Figure 2:
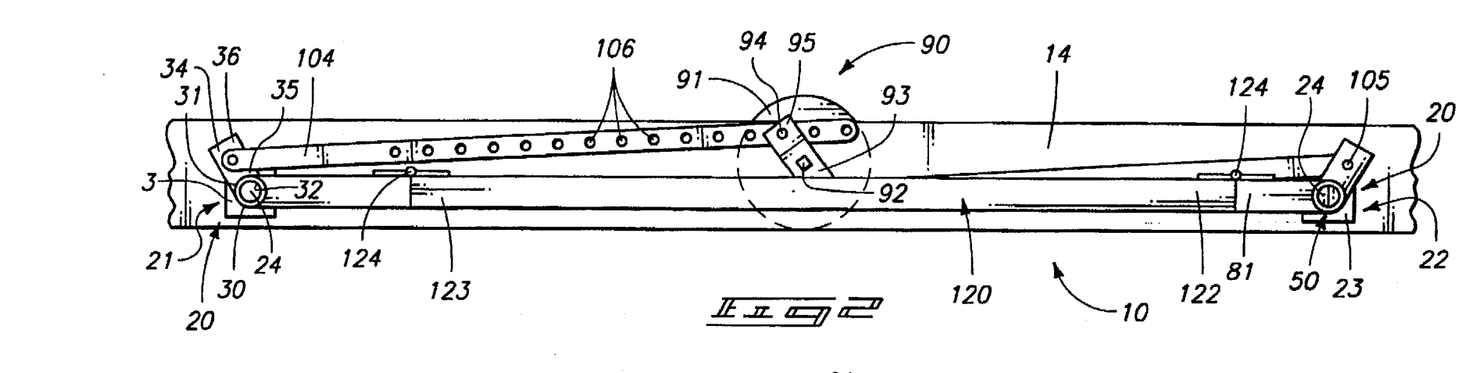
FIG. 2 is a partial side elevational view of the apparatus of FIG. 1.

FIGS. 2 and 3 show that running board apparatus 10 includes a pair of support members 20. Support members 20 are constructed for mounting upon the vehicle underbody, such as along the rocker panels, upon a frame addition or extension, or to a unibody bottom vehicle panel. The preferred support members 20 are individually designated as first bell crank support 21 and second bell crank support 22, respectively. The first and second supports 21 and 22 mount to the vehicle to provide support for a first end member 30 and a second end member 50, respectively. The supports and end members are preferably constructed and engaged in a manner which allows the end members to pivot or otherwise swing upon or rotate about their respective supports.

As shown, each support 21 and 22 includes a support base portion 23. Base 23 is mounted to the vehicle, preferably at a fixed position utilizing conventional fastening techniques, such as by welding or bolting. Supports 21 and 22 each advantageously includes a support shaft 24 which extends outwardly and provides a journal section upon which the end members 30 and 50 pivot. The shafts are advantageously made integral with the base portion.

The pair of support members 20 are mounted to the vehicle at positions which are along or adjacent to the sides of the vehicle. As shown in FIG. 1, the first support 21 is mounted aft of the second support 22, both being at positions spaced approximately the same distance from the longitudinal centerline or axis of vehicle 11. The pivot axes of end members 30 and 50 are defined by the journal sections of the shafts 24. These pivot axes are transverse to the longitudinal axis of the vehicle. Further, each of the shafts 24 is oriented in a substantially parallel, spaced relationship upon the vehicle. Each of the cylindrically shaped shafts 24 has an extreme distal end 25 which is positioned outboard on the vehicle.

The first end member 30 is preferably in the form of a bell crank. The first bell crank 30 includes a central portion, or collar portion 31 (also called a sleeve or sleeve portion). Collar 31 is in the form of a tubular sleeve which has a bore or channel 32. The bore has a diametral dimension that is just slightly greater than the outside diametral dimension of the cylindrically shaped journal of shaft 24. Therefore, the central portion 31 of the first bell crank is operable to receive one of the cylindrically shaped shafts 24. This renders the first bell crank pivotal about a first pivot axis defined by the shaft.

The first bell crank 30 also includes a pair of arms. The pair of arms include a first or control arm 34. The control arm has a proximal end 35 which is secured to the collar or sleeve portion 31, such as by welding or the like. The control arm also has an opposite distal end 36.

The first bell crank 30 also includes a second or swing arm 40. Swing arm 40 has a proximal end 41 which is secured to the tubular collar or sleeve 31, such as by welding or the like. The swing arm 40 has an opposite distal end 42.

Figure 4:
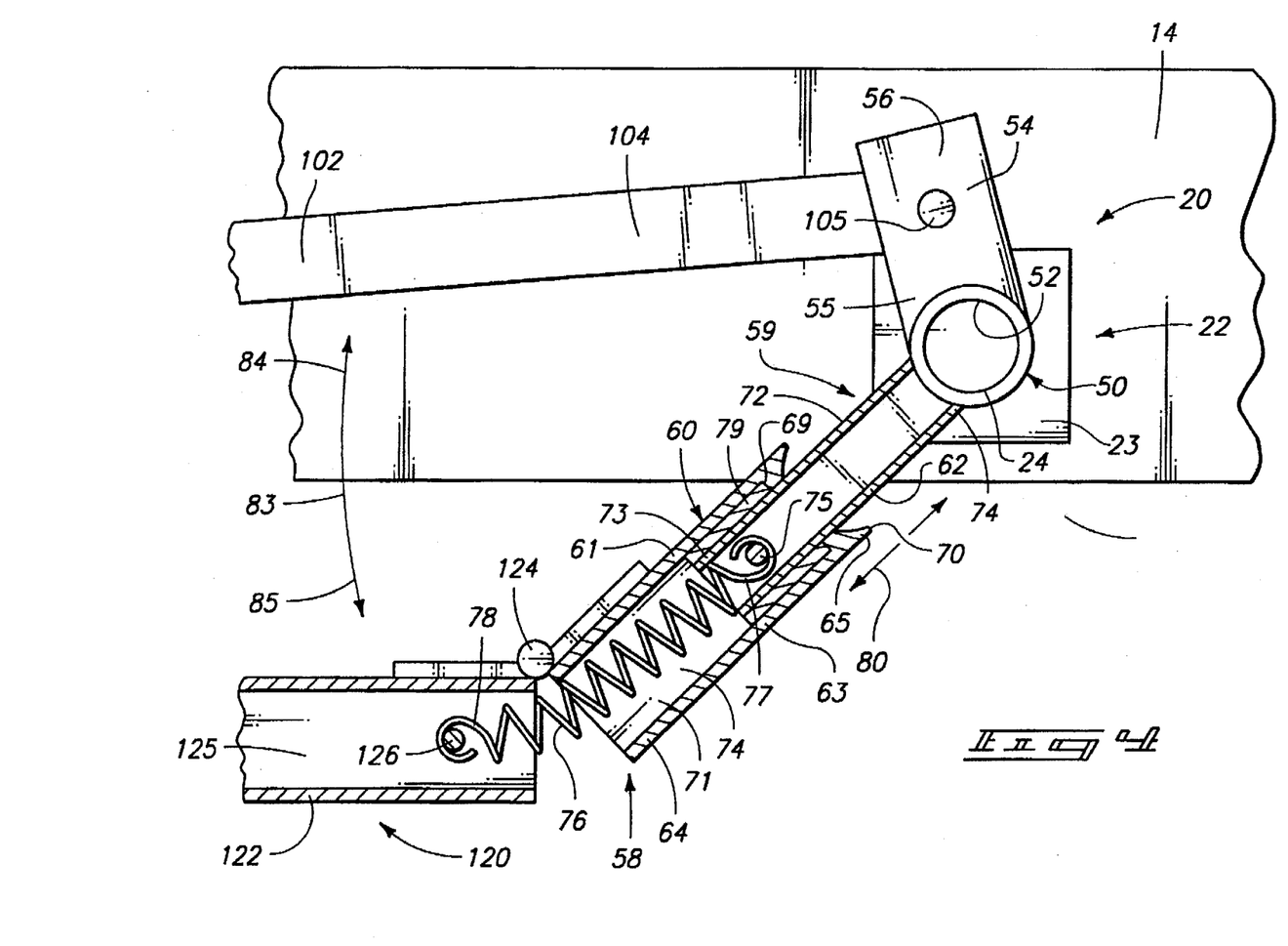
FIG. 4 is an enlarged sectional view which illustrates the second arm of the second bell crank.

FIGS. 3 and 4 best show the second end member 50. Second end member 50 is preferably in the form of a second bell crank. The second bell crank 50 has a central portion or collar 51 (also called a sleeve or sleeve portion) which is advantageously in the form of a tubular sleeve. Collar 51 includes a bore or channel 52 which receives the support shaft 24. The channel has a predetermined diametral dimension which is slightly greater than the journal portion of the cylindrically shaped shaft 24 which is received therein. As shown, the second bell crank 50 is pivotal relative to the support shaft 24.

Second bell crank 50 also includes a pair of second bell crank arms. The pair includes a first or control arm 54. Control arm 54 has a proximal end 55 which is affixed or secured, such as by welding or the like, to the collar or sleeve 51. The control arm also has an opposite distal end 56.

Second bell crank 50 also includes a second or swing arm 60. Swing arm 60 has a distal end 58 and a proximate end 59. The proximal end is connected to the sleeve 51. As shown, second bell crank swing arm 60 includes a first portion 61, and a second portion 62 which cooperate to allow longitudinal extension and contraction. Details of the function and relationship provided by first and second portions 61 and 62 is explained below in connection with the extension compensator description of which they form a part.

The first and second arms of the bell cranks 30 and 50 are preferably connected to their respective sleeves 31 and 51 at different axial positions along the sleeves. This displaced positioning of the bell crank arms along the axis of the sleeve is desirable for several reasons as is indicated below. The control arms 34 and 54 of the two bell cranks are substantially aligned at complementary inboard locations. Control arms 34 and 54 are preferably positioned at or near the inboard ends of the sleeves 31 and 51. The swing arms 40 and 60 are similarly in substantially aligned positions near the outboard ends of the sleeves 31 and 51.

The preferred running board assembly also includes a third or central longitudinal member 120. Longitudinal member 120 is supported by the swing arms 40 and 60 of the respective first and second bell cranks 30 and 50. The longitudinal member 120 has a forward end 122 and an opposing or rearward end 123. The longitudinal member is flexibly connected to the swing arms 40 and 60 so as to allow relative angular displacement between the longitudinal member and each swing arm. This is advantageously accomplished by providing a pivotal connection between the longitudinal member and the swing arms. As best illustrated by FIGS. 3 and 4, a pair of hinges 124 movably and pivotally mounts the longitudinal member 120 to the respective swing arms 40 and 60. In the preferred construction shown, the longitudinal member 120 is a hollow or tubular piece which defines a longitudinal member channel 125 therein. See FIG. 4.

Longitudinal member 120 can be used directly as a footrest upon which a person steps, or can otherwise function directly as a running board. FIG. 1 shows a preferred alterative wherein longitudinal member 120 is covered with an exposed central running board facia piece 127. Central running board facia 127 covers the longitudinal member 120 and provides a wider footrest. Similarly, FIG. 1 also shows a rearward facia piece 131 and forward facia piece 132 which are connected to the first and second swing arms 40 and 60. The facia pieces can be made in a variety or styles and shapes as desired. Metals, fiberglass or other materials are appropriate.

The first and second swing arms 40 and 60 form with the longitudinal member 120 an extension linkage subassembly. The extension linkage is in the retracted position shown in FIG. 2 arranged such that the swing arms 40, 60 and longitudinal member are approximately aligned between the support shafts 24. In the extended deployed position shown in FIG. 3, the extension linkage subassembly is moved into an arrangement or configuration wherein the swing arms 40 and 60 have each pivoted in opposite angular directions. The distal ends of the swing arms are moved downwardly. The configuration shown in FIG. 3 has a longer linkage path length between shafts 24, than the path length shown in FIG. 2. The swing arms preferably are displaced angular amounts which move the longitudinal member the same amount at each end. This downwardly or combined downwardly and outwardly motion places the central longitudinal member is a more accessible position for use by a person entering or exiting the vehicle. The extended position of the linkage subassembly also places the swing arms in opposed angled relationship pointing downward to stabilize the ends of the longitudinal member.

Running board assembly 10 is advantageously provided with an extension compensator 81. See FIG. 2. Extension compensator 81 is preferably included as part of at least one of the extension linkage members. As shown, extension compensator is formed as part of the second swing arm 60. Second swing arm 60 is adapted to include an extension compensator first portion 61 which slides relative to a second portion 62. The first portion 61 includes a main body piece 63. Body piece 63 has a distal or first end 64, and an opposing second or proximal end 65. As best seen in FIG. 4, a substantially semicircular seat 70 is formed in the proximal end 65 and provides a means for guiding the second portion. Seat 70 further limits relative motion between the first and second portions when contracted since seat 70 may abut against collar 51 when the board is in its retracted position.

The main body piece 63 further includes a channel 71 which has predetermined cross-sectional dimensions. FIG. 4 shows that the first and second portions 61 and 62 are slidably connected in a telescoping relationship. The second portion 62 is received within the first portion 61, and has a second portion main body 72 which has a proximal or first end 74 and an opposite, second or distal end 73. Proximal end 74 is fixed, as by welding or the like, to the central portion or collar 51.

The extension compensator also preferably includes a compensator biasing spring 76. Spring 76 is connected to urge the two complementary parts 61 and 62 of the compensator into a retracted position. Spring 76 also more generally biases the hinge 124 connecting longitudinal member 120 with the second bell crank swing arm 60. As shown, a spring connection feature 75 is provided in a predetermined position internally of the second portion 62. Spring 76 has one end 77 connected to first spring connection 75. Shown in FIG. 4, spring connection 75 is a pin positioned transversely within the second portion 62 upon which the one end 77 of spring 76 is hooked. The spring has an opposite end 78 which is similarly held by a second spring connection 126 which is mounted in channel 125 of the longitudinal member. The rigid connection at hinge 124 transfers the force of spring 76 to the first portion 61. The operation of the spring will be discussed hereinafter.

Extension compensator 81 also includes a movement limiting member or extension stop 79. Stop 79 is fastened on the distal end 73 of the second portion 62 and engages a shoulder 69 formed within the proximal end 65 of the first portion 61. Stop 79 limits the movement of the second portion 62 relative to the first portion 61 to an extended position.

The first and second portions are movable in a relative manner along a substantially reciprocal linear path of travel, shown in FIG. 4 by arrow 80. This slidable reciprocal motion extends between a first or contracted position 81 (FIG. 2) wherein the second swing arm 60 has the shortest length dimension, to a second or extended position 82 (FIG. 3) where the second swing arm 60 has the longest length dimension. As will be recognized, the second bell crank 50 is also movable along a swing arc 83 from a first arc position 84 corresponding to the retracted position to a second arc position 85 corresponding to the extended position (see FIG. 4).

The running board assembly also preferably includes a drive assembly which is generally designated by the numeral 90. As shown, drive 90 is advantageously powered. The preferred drive 90 includes both an operator and a swing arm pivot control mechanism which are integrated. The swing arm pivot control mechanism is fully described below.

The operator includes a drive motor 91. Motor 91 can be mounted or otherwise borne by the overland vehicle 11. Alternatively, the motor can be otherwise mounted to apply force to operate the extension linkage between the extended and retracted positions. Motor 91 is operable to rotate in both a clockwise and counterclockwise direction so as to provide both powered extension and powered retraction of the running board assembly. An energizing control system is provided for controlling the motor as described below.

The motor 91 includes a drive shaft 92 which controllably transmits torque to a motor output bar 93 which is preferably mounted upon the shaft. Output bar 93 is preferably symmetrical about the motor shaft axis and provides opposing drive ends 95. A first drive end is connected to a first drive arm connecting rod 101, and a second drive end is connected to a second drive arm connecting rod 102. Each drive arm has a proximal end 103 which is mounted on one end of the output bar 93, and an opposite distal end 104. The near and remote ends 103 and 104 of both drive connecting rods 101 and 102 are pivotally mounted by means of pins or fasteners 94 to the output bar 93 and the control arms 34 and 54, respectively. Further, the first connecting rod 101 has a plurality of apertures 106 formed therein and which provides a convenient means to adjust the travel of the apparatus 10. It should be understood that energizing the motor imparts substantially simultaneous and corresponding rotational movement to the drive output bar 93. This rotational motion, in turn, imparts force to the respective connecting rods. As force is imparted or transmitted, the first and second bell cranks 30 and 50 are caused to pivot in substantially opposite directions, and along their given, arcuately shaped paths of travel 43 and 83 (FIG. 3), respectively.

The drive also includes features and is constructed so as to form a swing arm control mechanism. The swing arm control is provided by the connecting rods 101 and 102 which are coupled to a coordinating link in the form of the drive output bar 93. The coordinating drive link output bar 93 pivots as supported by the bearing (not shown) of motor 91. The distances between the motor pivot axis and the connecting pins 94 at the drive ends 95 are appropriately sized so as to provide substantially equal angular displacement of the pin connections which is ultimately transferred to both swing arms 40 and 60. The angular displacement of the swing arms is also affected by the lengths of the control arms 34 and 54 and the lengths of the swing arms 40 and 60. The desired net effect is to provide extension of the longitudinal member in a coordinated fashion with each end of the longitudinal member being moved an approximately equal distance. This provides a running board surface which maintains the same orientation relative to the vehicle.

Figure 5:
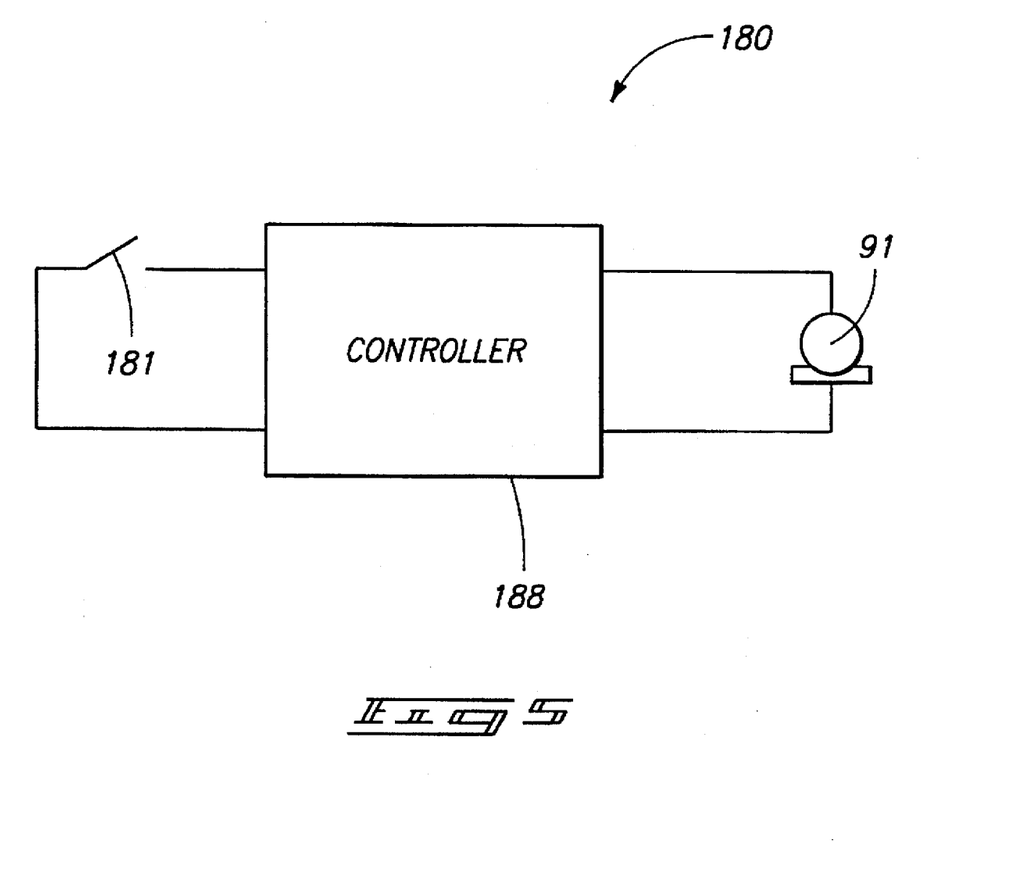
FIG. 5 is a schematic diagram showing a preferred control system used in the apparatus of FIG. 1.

The running board apparatus 10 also preferably is provided with a control system 180 which is effective at automatically controlling the running board to extend and retract. FIG. 5 shows the control system 180. The control system preferably includes a sensor 181. Sensor 181 is preferably in the form of a door activated switch (FIG. 1) which senses the condition of the vehicle to determine whether the door is opened or closed. The sensor signal is detected by controller 188 which can be a variety of electrical devices, including a relay. The controller is connected to motor 91 so as to operate the motor into an extension mode when the vehicle door is opened. Alternatively, the controller controls to operate the motor into a retraction mode when the door switch senses the vehicle door is closed. This allows automatic extension and retraction of the running board. The controller output connections will depend on the specific motor used, a variety of which are acceptable.

The operation of running board 10 has been described hereinabove in whole or in part. However, a summarizing explanation is now provided. The running board 10 for an overland vehicle 11 is best seen by a study of FIGS. 3 and 4. As shown therein, the support bases of the pair of support members are attached directly to the vehicle frame. Also shown in FIGS. 3 and 4, first and second bell crank support members 21 and 22 are borne by the overland vehicle 11, and are positioned in predetermined, fixed-spaced relation, one-to-the-other. The support bases are preferably placed so that the semicircular seat 70 of the second end member swing arm first portion 61 is adjacent the second end member collar 51 when the running board is in its inoperative position. First and second bell cranks 30 and 50, respectively, are individually pivoted or otherwise swung supported by the first and second bell crank support members. The swing arms thereof are movable along individual, substantially arcuately shaped paths of travel 43, and 83 respectively. The motor output bar opposing drive ends are attached to the first and second drive connecting rods via the fasteners 94. If it is desired to make the assembly automatic, then the control system 180 is installed. Facie pieces are also added if desired.

The drive assembly 90 is operated in force transmitting relation relative to the first and second bell cranks. Finally, the longitudinal member 120 at its opposite ends 122 and 123, is supported upon the first and second bell crank swing arms, respectively. The longitudinal member is movable along a given path of travel 140 between a first or fully retracted position 141 and a second or extended position 142 when the drive assembly is energized and controlled to extend.

More specifically, the vehicular running board 10 includes a first bell crank 30, which is mounted for pivotable movement on the overland vehicle 11, and wherein the first bell crank includes first and second arms 34 and 40 which have predetermined, fixed length dimensions. In addition, the second bell crank 50 is also mounted for pivotal movement on the overland vehicle 11, and is movable along a predetermined path of travel 83 which is substantially in the same plane as the path of travel 43 of the first bell crank. Further, the second bell crank has a first arm 54, which has a fixed length dimension, and a second arm 60, which has an adjustable length dimension. In particular, the second portion 62 telescopes within the first portion 61. The second portion is movable along a given path of travel 80 from a first, or contracted position 81, to a second, or extended position 82, when the drive assembly is energized for driving the running board 120 from the first, stored position 141 to the second, deployed position 142. As should be recognized, this extension or lengthening of the second arm, compensates for the movement of the running board as it is urged along its respective path of travel 140.

The drive assembly central drive link output bar 93 is disposed in force receiving relation relative to the motor 91. Further, first and second connecting rods 101 and 102 are mounted in force transmitting relation with the output bar. The first and second connecting rods 101 and 102 are respectively connected in force transmitting relation relative to the individual first arms 34, and 54 of each of the first and second bell cranks 30 and 50. As best illustrated by reference to FIG. 3, when the motor 91 is energized, the force imparted by the motor has the effect of causing the individual bell cranks 30 and 50 to rotate in opposite directions and along their respective, arcuately shaped paths of travel 43 and 83. Still further, the force of the motor has the effect of driving the running board 120 along its respective path of travel 140 between the first, stored position 141, and the second, deployed position 142. As the running board moves along its respective path of travel, it is maintained in a substantially horizontal orientation.

Use of the running board assembly not having a control system is accomplished by placing a person's weight upon the upper surface of the longitudinal member 120. Since a person's weight is a generally greater force on the longitudinal member than the tensive force of the compensator biasing spring 75, the first and second portions 61, 62 of the second end member bell crank swing arm 60 will telescopically extend, and longitudinal member 120 will move downward. These movements will continue until the second portion stop sleeve 79 meets the first portion shoulder 69, at which time the assembly stabilizes. The member 120 is preferably kept substantially horizontal regardless of where the person places his or her weight. This may be accomplished by using the drive assembly to rotate the first and second end member bell cranks 30, 50 in unison the same angular amount, although, in opposite angular directions. Once the person has removed his or her weight from the longitudinal member, the tensive force of the compensator biasing spring 75 urges the first and second portions 61, 62 to telescopically retract, which further causes the longitudinal member 120 to move upward and the first and second end member bell cranks 30, 50 to rotate counterclockwise and clockwise, respectively. The running board is thus moved back to its inoperative position.

Use of the running board assembly including a control system is accomplished by opening and closing of the vehicle door. Opening of the door is sensed by sensor 181 which inputs the signal to the controller 188. The controller outputs a command signal to the drive assembly drive motor 91 to cause the rotation of the motor output bar 93 via the drive shaft 92. Rotation of the motor output bar 93 causes like angular movements of the first and second end member bell cranks 30 and 50, although, in opposite angular directions. The torque of the drive motor is large enough to overcome the tensive force of the compensator biasing spring that is urging the linkage subassembly toward its retracted position. Therefore, the linkage subassembly is forced to its extended position, ready to be used by a person entering or exiting the vehicle. Closing the vehicle door causes the opposite response, wherein the control assembly commands the drive assembly to retract the linkage subassembly.

Therefore, the running board 10 of the subject invention can be utilized for operation on a wide variety of different overland vehicles 11 without substantial modifications thereto. In addition, the present invention may be used in all manner of other commercial environments where an extendible, and retractable, sideboard, or intermediate step may find usefulness. Further, the running board 10 can be easily installed, is simple to maintain, and further can be manufactured at a nominal price from steel, fiberglass, plastic or other suitable materials.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A running board apparatus for an overland vehicle, the running board apparatus having an extended operative position and a retracted inoperative position, the running board apparatus comprising:
   (a) first and second bell cranks rotatably connected to the vehicle, the axis of rotation of the first and second bell cranks being generally parallel, the first and second bell cranks each having a swing arm extending therefrom in an orientation generally transverse to the bell crank axes of rotation;
   (b) an extension linkage subassembly including a longitudinal member capable of acting as a bearing weight component of the running board apparatus, the longitudinal member being rotatably connected at a first end portion to the first bell crank swing arm and rotatably connected at a second end portion to the second bell crank swing arm; the swing arms being generally coplanar with the longitudinal member: wherein at least one of the first bell crank swing arm, the second bell crank swing arm, and the longitudinal member includes a first portion and a second portion, the second portion being extensibly connected to the first portion; and
   (c) a drive assembly for coordinating bell crank rotational movement, whereby operation of the drive assembly causes the first and second bell cranks to rotate in opposite directions which further causes the first and second portions to move from a retracted position in which the longitudinal member is at a first vertical height corresponding to the running board retracted inoperative position to an extended position in which the longitudinal member is at a second vertical height corresponding to the running board extended operative position.

2. The running board apparatus formed according to claim 1, further including first and second bell crank support members attachable to the vehicle and extending from the vehicle in a manner generally transverse to the vehicle longitudinal axis; and wherein the first bell crank is rotatably supported by the first crank support member and the second bell crank is rotatably supported by the second bell crank support member.

3. The running board apparatus formed according to claim 1, wherein:
   (a) the first bell crank includes a support engaging portion located along the first bell crank's axis of rotation and a control arm extending from the support engaging portion, the first bell crank swing arm also extending from the support engaging portion; and
   (b) the second bell crank includes a support engaging portion located along the second bell crank's axis of rotation and a control arm extending from the support engaging portion, the second bell crank swing arm also extending from the support engaging portion.

4. The running board apparatus formed according to claim 3, wherein:
   (a) the first bell crank control arm extends from the support engaging portion generally vertically upward and the first bell crank swing arm extends from the support engaging portion generally toward the second bell crank; and
   (b) the second bell crank control arm extends from the support engaging portion generally vertically upward and the second bell crank swing arm extends from the support engaging portion generally toward the first bell crank;
   (c) whereby the first and second bell cranks are caused to rotate in opposite angular directions during movement between the running board apparatus operative and inoperative positions.

5. The running board apparatus formed according to claim 4, wherein:
   (a) the first bell crank control arm extends from the support engaging portion generally vertically upward and the first bell crank swing arm extends from the support engaging portion generally toward the second bell crank; and
   (b) the second bell crank control arm extends from the support engaging portion generally vertically downward and the second bell crank swing arm extends from the support engaging portion generally toward the first bell crank;
   (c) whereby the first and second bell cranks are caused to rotate in like angular directions during movement between the running board operative and inoperative positions.

6. The running board apparatus formed according to claim 1, further including first and second bell crank support shafts attachable to the vehicle and extending from the vehicle in a manner generally transverse to the vehicle longitudinal axis; and wherein the first bell crank includes a collar rotatably supported by the first crank support shaft and the second bell crank includes a collar rotatably supported by the second bell crank support shaft.

7. The running board apparatus formed according to claim 1, wherein:
   (a) the first bell crank includes a collar along the first bell crank's axis of rotation and a control arm extending from the collar, the first bell crank swing arm also extending from the collar; and
   (b) the second bell crank includes a collar along the second bell crank's axis of rotation and a control arm extending from the collar, the second bell crank swing arm also extending from the collar.

8. The running board apparatus formed according to claim 7, wherein:
   (a) the first bell crank control arm extends from the collar generally vertically upward and the first bell crank swing arm extends from the collar generally toward the second bell crank; and (b) the second bell crank control arm extends from the collar generally vertically upward and the second bell crank swing arm extends from the collar generally toward the first bell crank;

(c) whereby the first and second bell cranks are caused to rotate in opposite angular directions during movement between the running board operative and inoperative positions.

9. The running board apparatus formed according to claim 7, wherein:

(a) the first bell crank control arm extends from the collar generally vertically upward and the first bell crank swing arm extends from the collar generally toward the second bell crank; and (b) the second bell crank control arm extends from the collar generally vertically downward and the second bell crank swing arm extends from the collar generally toward the first bell crank;

(c) whereby the first and second bell cranks are caused to rotate in like angular directions during movement between the running board operative and inoperative positions.

10. The running board apparatus formed according to claim 1, wherein:

(a) the first bell crank further includes a control arm extending from the first bell crank in an orientation distinct from the first bell crank axis of rotation;

(b) the second bell crank further includes a control arm extending from the second bell crank in an orientation distinct from the second bell crank axis of rotation; and (c) the drive assembly includes:

(i) a drive member capable of rotating about a fixed position relative to the vehicle;

(ii) a connecting rod pivotably attached to the first bell crank control arm and drivingly engaged with the drive member, (iii) a second connecting rod pivotably attached to the second bell crank control arm and drivingly engaged with the drive member; and (iv) whereby rotation of the drive member causes translation of the connecting rods which further causes angular rotation of the control arms and arcuate movement of the swing arms; the arcuate movement of the swing arms being accommodated by the telescopic relation of the first and second portions.

11. The running board apparatus formed according to claim 10, wherein the drive assembly further includes a drive motor being mounted to the vehicle and having a drive shaft for rotating the drive member.

12. The running board apparatus formed according to claim 11, wherein the running board further includes a control system for automatically effecting the running board position between the operative and inoperative positions; the control system including a controller connected to the drive motor and a sensor for determining the desired running board position and for inputting a signal to the controller.

13. The running board formed according to claim 12, wherein the sensor is a door activated switch and the sensor input signal includes a door open signal and a door closed signal.

14. An extendible vehicle running board comprising:

(a) a first end member including a swing arm rotatably mountable on a vehicle about an axis of rotation generally perpendicular to the swing arm;

(b) a second end member including a swing arm adapted to be rotatably mountable on the vehicle about an axis of rotation generally perpendicular to the swing arm; and (c) a longitudinal member rotatably connected at one end to the first end member swing arm and rotatably connected at the other end to the second end member swing arm, the end member axes of rotation being generally transverse to the longitudinal member;

(d) wherein at least one of the first end member swing arm, the second end member swing arm, and the longitudinal member includes a first portion and a second portion; the second portion being in a sliding extension and retraction relation with the first portion; and (e) means for sliding the first and second portions relative to each other to thereby raise and lower the longitudinal member, wherein the first and second swing arms are generally coplanar with the longitudinal member when the longitudinal member is in one of an inoperative position and an operative position.

15. The running board formed according to claim 14, wherein the longitudinal member further includes a facia piece for providing a wider step area.

16. The running board formed according to claim 14, wherein:

(a) the first end member swing arm is positioned forward of its axis of rotation relative to the vehicle;

(b) the second end member swing arm is positioned aft of its axis of rotation relative to the vehicle; and (c) the longitudinal member is positioned substantially between the end members, the longitudinal member being located at an inoperative vertical height that is higher than its operative vertical height relative to the vehicle.

17. The extendible vehicle running board according to claim 14, further including at least one biasing member which biases the running board toward an inoperative position by urging the longitudinal member vertically upward by moving the first portion in the direction of the second portion.

18. The running board formed according to claim 17, wherein (a) the second end member includes first and second portions in sliding relation with one another; and (b) the biasing member is a compression spring attached at one end to the first portion and at the other end to the second potion, the biasing spring continually urging the first potion and the second potion toward each other.

19. The running board formed according to claim 17, wherein (a) both the first and second end members include first and second portions in sliding relation with one another; and (b) the biasing member is a pair of compression springs; one spring attached at one end to the first end member first portion and at the other end to the first end member second portion; the other spring attached at one end to the second end member first portion and at the other end to the second end member second portion; each biasing spring continually urging the first portion and the second portion toward each other.

20. The running board formed according to claim 14, further including a drive assembly for coordinating end member rotational movement.

21. The running board formed according to claim 20, further including a control system for automatically effecting the running board position between operative and inoperative positions; the control system including a controller connected to the drive assembly and a sensor for determining the desired running board position and for inputting a signal to the controller.

22. The running board formed according to claim 21, wherein the sensor is a door activated switch and the sensor input signal includes a door open signal and a door closed signal.

23. The ruining board formed according to claim 20, wherein:
   (a) the first end member further includes a control arm extending from the first end member at an orientation distinct from the first end member axis of rotation;
   (b) the second end member further includes a control arm extending from the second end member at an orientation distinct from the second end member axis of rotation; and
   (c) the drive assembly includes:
      (i) an output member capable of rotating about a fixed position relative to the vehicle;
      (ii) a first connecting rod pivotably attached to the first end member control arm and pivotably attached to the output member; and
      (iii) a second connecting rod pivotably attached to the second end member control arm and pivotably attached to the output member,
      (iv) whereby rotation of the output member causes translation of the connecting rods which further causes angular rotation of the control arms and arcuate movement of the swing arms; the arcuate movement of the swing arms being accommodated by the sliding relation of the first and second portions.

24. The running board formed according to claim 23, wherein the drive assembly further includes a drive motor being mounted to the vehicle and having a drive shaft upon which the output member is rotated.

25. The running board formed according to claim 24, further including a control system for automatically effecting the running board position between the operative and inoperative positions; the control system including a controller connected to the drive motor and a sensor for determining the desired running board position and for inputting a signal to the controller.

26. The running board formed according to claim 25, wherein the sensor is a door activated switch and the sensor input signal includes a door open signal and a door closed signal.

27. An extendible and retractable vehicle running board assembly for mounting along the side, back, or front of an overland vehicle, the running board being movable between extended and retracted positions, the running board comprising:
   (a) first and second end members rotatably attached to the vehicle, oriented with their axes of rotation generally parallel to one another in a roughly horizontal plane; each end member having a swing arm extending therefrom in a direction distinct from the end member axes of rotation;
   (b) an extension linkage subassembly including a running board rotatably connected to and between the first and second end member swing arms; the axes of rotation of the end members being generally transverse to the running board length; at least one of the running board and the swing arms including a retractable and extendible portion for allowing movement of the running board between retracted and extended positions; and
   (d) a drive assembly for coordinating end member rotational movement, wherein the first and second swing arms are generally coplanar with the longitudinal running board when the longitudinal member is in one of the retracted and extended positions.

28. The extendible and retractable vehicle running board assembly formed according to claim 27, wherein the drive assembly includes:
   (a) an output bar;
   (b) a first rod pivotably connected to the first end member and to the output bar;
   (c) a second rod pivotably connected to the second end member and to the output bar; and
   (d) a drive motor connected to the output bar for causing rotation of the output bar which further causes coordinated rotation of the end members via the first and second rods.

29. The extendible and retractable vehicle running board assembly formed according to claim 27, further including at least one biasing member which biases the running board toward its inoperative position by urging the first portion in the direction of the second portion.

30. The extendible and retractable vehicle running board assembly formed according to claim 29, wherein:
   (a) the second end member swing arm includes a retractable and extendible portion having first and second portions in telescopic relation with one another;
   (b) the biasing member is a compression spring attached at one end to the first portion and at the other end to the second portion, the biasing spring continually urging the first portion and the second portion toward each other.

31. The extendible and retractable vehicle running board assembly formed according to claim 27, further including a control system for automatically effecting the running board position between the operative and inoperative positions; the control system including a controller connected to the drive assembly and a sensor for determining the desired running board position and for inputting a signal to the controller.

32. The extendible and retractable vehicle running board assembly formed according to claim 31, wherein the sensor is a door activated switch and the sensor input signal includes a door open signal and a door closed signal.

33. An extendible and retractable vehicle running board assembly for mounting along the side or back of an overland vehicle and which is movable between extended operative and retracted inoperative positions, the extendible and retractable vehicular running board assembly comprising:
   (a) first and second swing arms rotatably attached to the vehicle, oriented with their axes of rotation generally parallel to one another; the swing arms lying in directions distinct from their axes of rotation the plane of swing of the swing arms being generally coplanar;
   (b) a running board rotatably connected to the first and second swing arms;
   (c) wherein at least one of the running board and the swing arms includes a retractable and extendible portion having a biasing member which biases the running board toward its inoperative position by urging the retractable and extendible portion to its retracted position; and (d) a drive assembly for coordinating the rotation and angular orientation of the first and second swing arms, wherein the first and second swing arms are generally coplanar with the running board when the running board is in its inoperative position.

34. The extendible and retractable vehicle running board assembly formed according to claim 33, further including first and second control arms rigidly attached to the first and second swing arms respectively; wherein the drive assembly is in pivotable relation with the control arms.

35. The extendible and retractable vehicle running board assembly formed according to claim 33, further including a control system for automatically effecting the running board position between the operative and inoperative positions; the control system including a controller connected to the drive assembly and a sensor for determining the desired running board position and for inputting a signal to the controller.

36. A retractable running board assembly for mounting to a vehicle comprising:

(a) first and second swing arms rotatably connected to the vehicle and oriented with their axes of rotation generally parallel to one another;

(b) a running board, the first swing arm being pivotably attached to one end portion of the running board, the second swing arm being pivotably attached to the other end portion of the running board;

(c) wherein at least one of the running board and the swing arms includes first and second portions that are retractable and extendible relative to each other and a biasing system which biases the running board from and extended operative position toward a retracted inoperative position by urging the first and second portions to their retracted position; and (d) a drive assembly for coordinating the rotation of the first and second swing arms thereby to shift the running board between the extended and retracted positions;

(e) wherein in the running board retracted position, the first and second swing arms are substantially coplanar with of the running board, and in the running board extended position, the swing arms are rotated in opposite directions relative to each other into positions angular to the longitudinal direction of the running board to cause the first and second portions to extend relative to each other.

\* \* \* \* \*

UNITED STATES PATENT AND TRADEMARK OFFICE
CERTIFICATE OF CORRECTION

PATENT NO. : 5,697,626                    Page 1 of 2
DATED : December 16, 1997
INVENTOR(S) : P.K. McDaniel et al.

It is certified that error appears in the above-indentified patent and that said Letters Patent is hereby corrected as shown below:

| COLUMN | LINE | |
|---|---|---|
| On the title page: [54] Pg. 1, col. 1 | Title | "EXTENDABLE" should read --EXTENDIBLE-- |
| 9 (Claim 1, | 44 line 18) | After "member" delete ":" and insert therefor --when the longitudinal member is in the running board inoperative position;-- |
| 11 (Claim 10, | 36 line 12) | Between "a" and "connecting" insert --first-- |
| 11 (Claim 10, | 38 line 14) | After "drive member" delete "," and insert therefor --;-- |
| 12 (Claim 18, | 49 line 7) | "potion," should read --portion,-- |
| 12 (Claim 18, | 50 line 8) | "potion" should read --portion-- (both occurrences) |
| 13 (Claim 23, | 12 line 1) | "ruining" should read --running-- |
| 13 (Claim 23, | 30 line 18) | After "output member" delete "," and insert therefor --;-- |

UNITED STATES PATENT AND TRADEMARK OFFICE
CERTIFICATE OF CORRECTION

PATENT NO. : 5,697,626  
DATED : December 16, 1997  
INVENTOR(S) : P.K. McDaniel et al.

It is certified that error appears in the above-indentified patent and that said Letters Patent is hereby corrected as shown below:

| COLUMN | LINE | |
|---|---|---|
| 14 (Claim 33, | line 9) | After "rotation" insert --,-- |
| 16 (Claim 36, | line 14) | "and extended" should read --an extended-- |
| 16 (Claim 36, | line 22) | After "with" delete "of" |

Signed and Sealed this

Twenty-sixth Day of May, 1998

Attest:

BRUCE LEHMAN

*Attesting Officer*   *Commissioner of Patents and Trademarks*